United States Patent [19]

Brandt

[11] 4,384,473
[45] May 24, 1983

[54] ENGINE KNOCK CONTROL WITH DETECTOR AND FILTER

[75] Inventor: Herman F. Brandt, Birmingham, Mich.

[73] Assignee: General Motors Corporation, Detroit, Mich.

[21] Appl. No.: 295,746

[22] Filed: Aug. 24, 1981

Related U.S. Application Data

[63] Continuation-in-part of Ser. No. 149,645, May 14, 1980, abandoned.

[51] Int. Cl.³ .......................... G01L 23/22; F02P 5/04
[52] U.S. Cl. ...................................................... 73/35
[58] Field of Search ..................... 73/35; 123/425, 435

[56] References Cited

U.S. PATENT DOCUMENTS

| | | |
|---|---|---|
| 2,678,997 | 5/1954 | Darlington . |
| 3,252,093 | 5/1966 | Lerner . |
| 4,106,447 | 8/1978 | West ................................... 123/425 |
| 4,111,035 | 9/1978 | West et al. ............................... 73/35 |

OTHER PUBLICATIONS

EPA paper 460-3-78-009 pp. 26, 27, 60, 61, 66–74, 80, 81 Sep. 1978.

Primary Examiner—James J. Gill
Attorney, Agent, or Firm—Robert M. Sigler

[57] ABSTRACT

A spark ignited internal combustion engine includes apparatus effective to generate a signal from knock-induced and other ringing vibration bursts with amplification over a wide passband around the characteristic knock frequency. The signal is demodulated to obtain the envelope pulses of the knock and other vibration bursts and filtered in a low pass filter having a half power frequency from 60–200 Hertz. The output of this filter, in which other pulses are significantly attenuated with respect to knock pulses, is further processed to obtain a knock control signal which controls spark retard apparatus to limit knock intensity.

10 Claims, 8 Drawing Figures

ENGINE KNOCK CONTROL WITH DETECTOR AND FILTER

BACKGROUND OF THE INVENTION

This application is a continuation-in-part of application Ser. No. 149,645, filed May 14, 1980, now abandoned.

This invention relates to internal combustion engines having means to control knock or detonation therein and particularly to such engines wherein the means includes a sensor responsive to engine knock vibrations and effective to generate an electrical signal therefrom which can be used to detect engine knock above a trace level. In such a system, closed loop control means may be provided for the engine in response to the signal to control engine knock to the trace level.

It is an observed characteristic of engine knock that is generates bursts of ringing vibrations in the engine, the vibrations being characterized by at least one frequency characteristic to the particular engine and having a peak-to-peak amplitude which increases rapidly and then decreases more slowly over a period usually lasting from about two or three to ten milliseconds. These vibrations may generally be sensed by an accelerometer or vibration sensor in contact with an engine component.

However, there is a great deal of additional noise and vibration produced in a typical multicylinder, reciprocating piston, internal combustion engine, which vibrations form background noise from which knock vibrations must be distinguished. The problem of distinguishing knock vibrations is further compounded by the fact that many of the other vibrations have a peak-to-peak amplitude comparable with that of audible knock and include significant energy at the same frequency which is characteristic of the knock vibrations. Most prior art knock sensing and control systems which relied solely on amplitude or frequency discrimination have not proved particularly successful in controlling knock to trace levels in a vehicle mounted engine under actual driving conditions. Only a carefully designed combination of the two methods, as shown in the U.S. Pat. No. 4,111,035, issued to Gene West and Glenn Hamron, has shown substantial commercial success. A knock control system similar to that shown in the aforementioned patent has been used for several years in vehicles having turbocharged engines and for a shorter period in vehicles having naturally aspirated engines with an increased compression ratio for improved power and fuel economy with unleaded gasoline.

Although the above described knock control system has proved commercially successful, improvements are still possible. Controlling knock to trace levels in closed loop is difficult to accomplish; and even the aforementioned system may, with some engines under extreme operating conditions, occasionally allow brief bursts of excessive knock or respond to noises other than knock and produce a condition known as false retard, the name of which condition is derived from the means by which knock is reduced, namely retarding the spark advance. In addition, the system uses a high Q bandpass filter which must be matched to the characteristic frequency of the particular engine on which the system is used. Although, with the proper sensor and design of the sensor mounting boss, the system can generally handle sample to sample variations of a particular engine design, it would be helpful in minimizing the number of separate electronic chips to cover a wide variety of engine designs having different characteristic knock frequencies if the narrow selectivity of the bandpass filter could be widened with no reduction in system performance.

Therefore, it is an object of this invention to provide an engine knock control system having improved ability to control engine knock to trace levels while maintaining good power, fuel economy and driveability.

It is a further object of this invention to provide an engine knock control system which more reliably differentiates between engine knock and other vibrations of similar amplitude and characteristic frequency.

It is still another object of this invention to provide an engine knock control apparatus including electronic signal processing apparatus capable of application to engines having different characteristic knock frequencies.

SUMMARY OF THE INVENTION

This invention comprises a knock control system for an internal combustion engine in which the signal from the knock sensor is supplied to a bandpass amplifier having a low Q or wide pass band. This amplifier is capable of rejecting the very high and very low frequency noise but accepts as signal content a range of frequencies sufficiently wide to include the characteristic knock frequencies of any engine anticipated.

The output of this wide pass band amplifier is then supplied to a detector which eliminates the knock frequency but leaves the envelope of the signal. The knock signal is thus treated as a modulated carrier wave and suppression of the carrier frequency takes place in this stage. The output of the detector is then provided to a low pass filter having a half power frequency within the range of 100 to 200 Hertz and preferably within the range substantially between 131 and 160 Hertz. This filter differentiates between knock pulses and most other noise pulses of comparable amplitude and characteristic frequency, suppressing the latter in favor of the former. The filter is preferably of the four pole variety in the best mode, although a smaller number of poles may provide control at a lower performance level.

The output of the filter is applied to further signal processing apparatus and engine control apparatus to maintain engine knock at trace levels or below. The apparatus permits the use of engine turbochargers or higher compression ratios and/or advanced spark timing for greater power and fuel economy.

Further details and advantages of this invention will be apparent from the accompanying drawings and following description of a preferred embodiment.

SUMMARY OF THE DRAWINGS

FIG. 5b shows the impulse response of a matched filter which is optimized for the wave shape shown in FIG. 5a.

DESCRIPTION OF A PREFERRED EMBODIMENT

Figure 1:
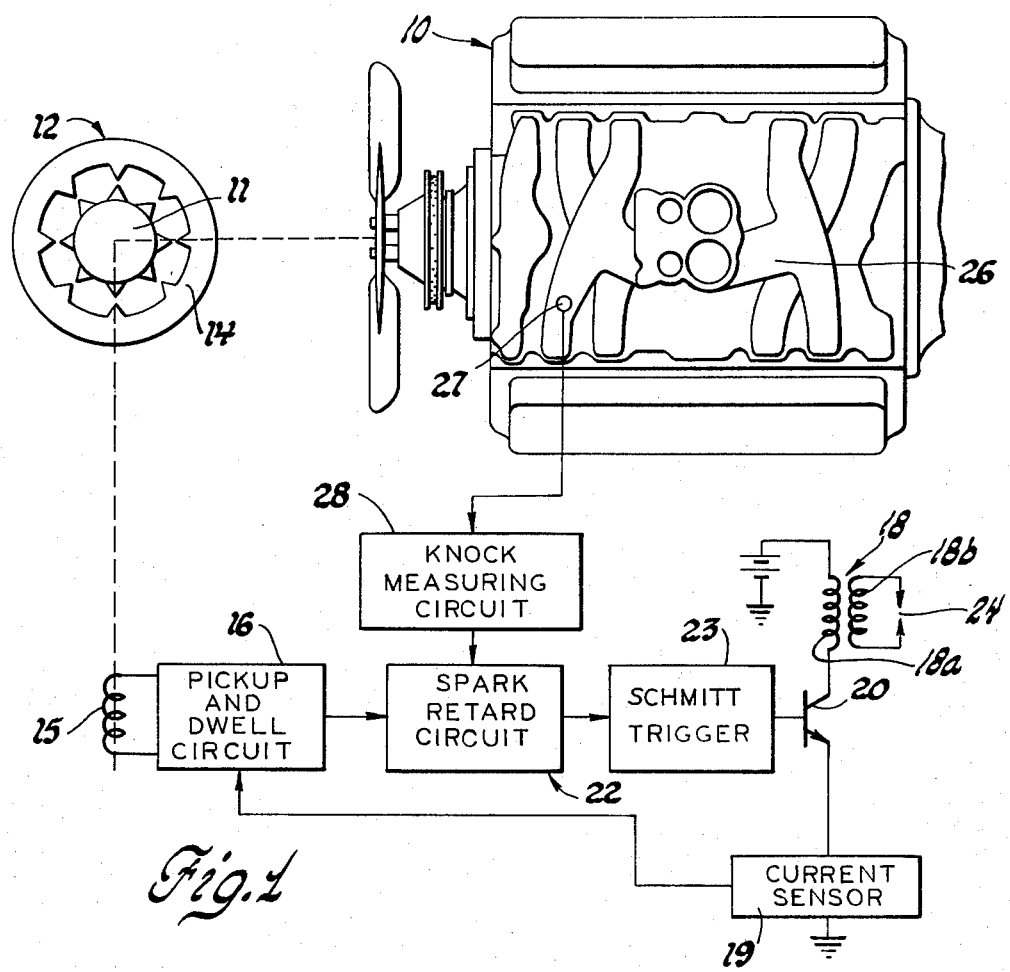
FIG. 1 is a schematic and block diagram of an internal combustion engine having a knock control system according to this invention.

Referring to FIG. 1, an internal combustion engine 10 has a rotating crankshaft which drives the rotor 11 of an alternating current signal generator 12. Generator 12 is a standard spark timing signal generator of the variable reluctance type disclosed and described in U.S. Pat. No. 3,254,247 to Folgy, which issued May 31, 1966. Generator 12 also includes a stator 14 and a pickup coil 15 and provides a plurality of equally spaced projections around rotor 11 and stator 14 related to the number of cylinders in engine 10. Relative rotation between rotor 11 and stator 14 at a speed proportional to engine speed produces a pulsating variation in reluctance which induces an alternating voltage signal in coil 15.

The alternating voltage signal in coil 15 is applied to pickup and dwell circuitry 16, which generates normal spark timing pulses. These normal spark timing pulses could be applied to a Schmitt trigger 23 to control a switching transistor 20 connected to switch current on and off in the primary 18a of spark coil 18. The flow of current in primary 18a causes electromagnetic energy to build up in spark coil 18; and this energy is released, when transistor 20 cuts off current in primary 18a, in the form of a high voltage spark pulse in coil secondary 18b applied to spark plug 24. A current sensor 19 provides feedback to pickup and dwell circuitry 16 to control the dwell time of current conduction in primary 18a. The system so far described is one well known in the art and shown in the U.S. patent to Richards et al U.S. Pat. No. 3,828,672, issued Oct. 1, 1974.

In order to selectively retard the spark timing in response to an engine knock signal, spark retard circuitry 22 is inserted between pickup and dwell circuitry 16 and Schmitt trigger 23. Apparatus suitable for use as such circuitry is shown in the aforementioned West U.S. Pat. No. 4,106,447. However, other appropriate spark retard circuits are well known.

Engine 10 is provided with a vibration or detonation sensor 27, which may be mounted on an intake manifold 26 as shown but may also be mounted on the block or another component of engine 10. The precise location of sensor 10 is determined by experiment for a particular engine so that it is sensitive to knock from all cylinders of the engine. Sensor 27 includes a threaded stud which is tightened into a threaded depression within a mounting boss formed at the desired location. Vibration sensor 27 thus vibrates physically with the engine or engine component upon which it is mounted and responds to such vibrations in at least its axial direction and possibly in other modes to generate electrical output voltage corresponding to such vibrations. Sensor 27 may be of the type which includes a permanent magnet to generate magnetic flux, an electric pickup coil and a magnetostrictive element within the coil in the path of the magnetic flux to vary the flux with vibration and thus generate the output voltage across the coil. An example of such a vibration sensor is shown in the U.S. Pat. No. 4,161,665, issued to Charles E. Buck et al on July 17, 1979. Alternatively, sensor 27 could be of the piezoelectric variety in which a piezoelectric element is attached to a portion of the sensor case for flexing therewith and thus generates an electrical output voltage as the sensor is vibrated.

The output signal from vibration sensor 27 is provided to knock measuring circuitry 28 in which a knock intensity signal is generated for application to spark retard circuit 22 to control the retard of the spark timing from the normal spark timing. Apparatus for use as knock measuring circuit 28 is shown in block diagram form in FIG. 2 and in circuit form in FIG. 3.

Figure 2:
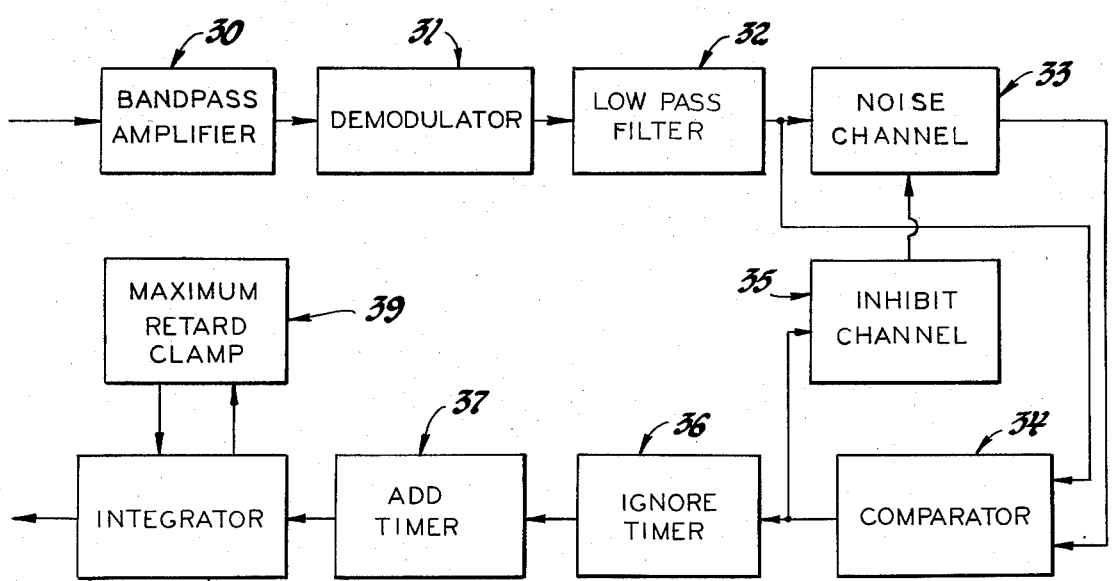
FIG. 2 is a block diagram of apparatus according to this invention suitable for use as the knock measuring circuit of FIG. 1.

FIG. 2 shows a block diagram of knock measuring circuit 28. The input signal from the sensor 27 is supplied to a bandpass amplifier 30. Amplifier 30 has two main functions in the system. The first is to provide the correct degree of amplification to the signal so that the signal is of sufficient strength to be usable but is not so strong as to surpass the limits of the power supply voltage and clip. Of course, the degree of amplification required depends to a great degree on the type of sensor used and the specific location and mounting of the sensor on engine 10; in this embodiment it is 14.2 dB. It is desirable, if possible, to provide a standard gain in amplifier 30, use the same sensor for all applications of the system and adjust the gain for a particular engine application by the sensor placement and mounting.

The second object of the bandpass amplifier 30 is to provide a very mild bandpass filter effect that will cut out undesirable noise at very low and high frequencies but will pass a wide band of frequencies in the audio range so that the circuit is not particularly sensitive to changes in characteristic knock frequency from engine to engine. A typical bandpass characteristic for amplifier 30 provides a Q of 0.5 about a center frequency of 6.2 kilohertz. It should be mentioned at this point, however, that the particular sensor with which this knock control system has demonstrated superior knock control ability provides a significant degree of bandpass filtering in its own output. The sensor itself provides, through its interactive resonance with the engine 10, a useful bandpass of approximately a thousand Hertz with good suppression of frequencies outside the bandpass. Thus, the main effect of the bandpass characteristic of amplifier 30 may be to filter out noise due to external electronic sources rather than noise due to the mechanical vibrations of engine 10. If such frequency selectivity were not provided by sensor 27, it might be desirable in some cases to provide a narrower bandpass in amplifier 30 than that previously described. However, the bandpass of amplifier 30 should not become too narrow, or the number of separate electronic packages for different engines may proliferate.

Figure 4:
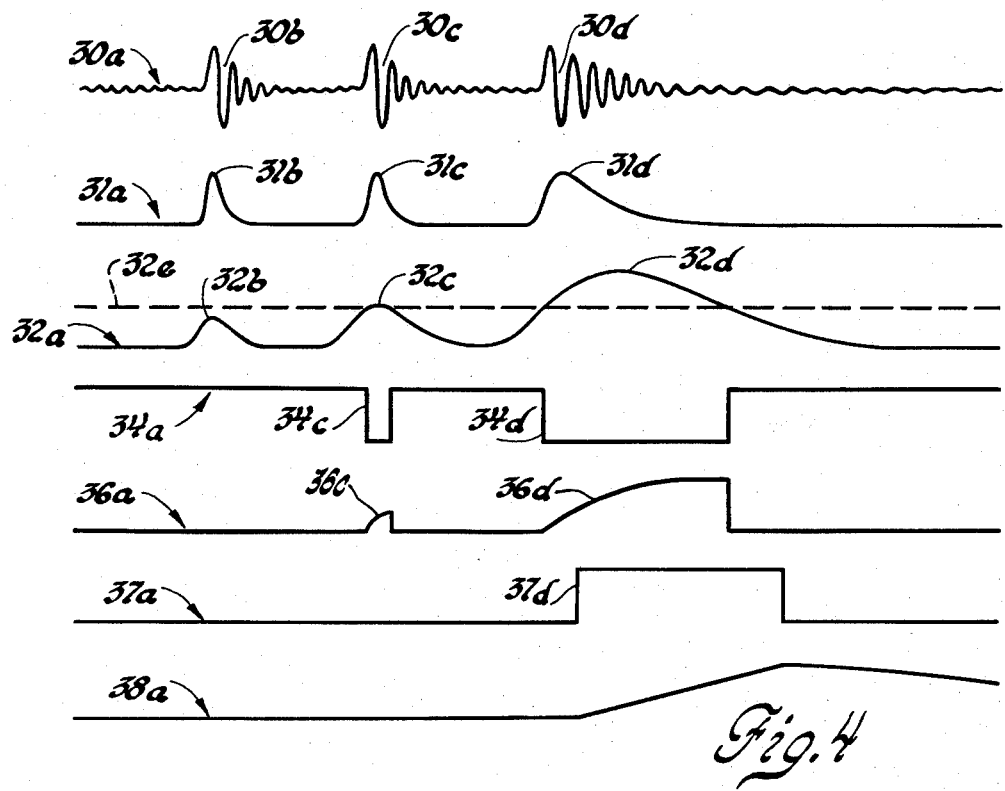
FIG. 4 is a series of time waveforms useful in illustrating the operation of the apparatus shown in FIGS. 1 through 3.

A representation of the output of bandpass amplifier 30 is shown as waveform 30a in FIG. 4. This waveform shows three ringing pulses of six kilohertz carrier frequency numbered 30b, 30c and 30d, the latter of which is a knock induced pulse while the former two are noise pulses of shorter duration. It appears to be the case that many of the high energy pulses that are not knock produced but tend to cause false retard exhibit a different shape in the time domain from that of a typical knock induced pulse. The duration of these noise pulses is generally significantly shorter than that of the knock pulse while their amplitude may be the same or even greater and their carrier frequency is the same characteristic frequency produced by knock events.

The output of bandpass amplifier 30 is provided to a demodulator 31 which extracts the envelopes of the pulses from the six to seven kilohertz carrier wave. A typical output of demodulator 31 is shown in waveform 31a of FIG. 4 and includes envelopes 31b, 31c and 31d corresponding to like-numbered pulses in waveform 30a.

The signal from demodulator 31 is provided to a low pass filter 32. This filter, in its broadest aspect, comprises a low pass filter having a half power frequency in the range of approximately 100 to 200 Hertz. In the preferred embodiment shown here, the filter 32 is a four pole low pass filter having a half power frequency of substantially 160 Hertz. The system has been tested with filters of one and four poles and half power frequencies of 100, 131, 160 and 200 Hertz. The best performance has been obtained with four poles and 131–160 Hertz. Analysis appears to indicate acceptable but decreasing performance as the number of poles is decreased from four. A system with a one pole filter at 160 Hz has shown performance which may be acceptable in some applications. Systems having filters with the two frequency extremes of 100 to 200 Hertz showed some degradation in performance with respect to those at 131 to 160 Hertz, although they still were able to control knock to some lesser degree of success. At half power frequencies of 100 Hertz and lower, the knock pulses appear to become so attenuated and drawn out in time that knock becomes difficult to detect; whereas, at half power frequencies of 200 Hertz and higher, the system becomes more prone to false retard. Between the 131 and 160 Hertz filters, some vehicles have shown slightly better performance with the former; some have shown slightly better performance with the latter; and some have shown no difference. Either might be considered as a preferred half power frequency; or the two might be considered to approximately define a range of optimum performance, as distinct from a wider range of acceptable performance.

If a large number of demodulated knock pulses show a similar shape and duration and the noise in which the pulses appear is assumed to be white noise, then the matched filter technique may be applied to a typical or averaged knock pulse to determine the optimal time domain filter characteristic to maximize the signal to noise ratio for that typical or average pulse. In the case of knock, a substantially large proportion of knock pulses have shapes such as that shown in FIG. 5a. The amplitude varies, of course, with the severity of knock, as does the duration; however, most pulses due to audible knock have durations of approximately three to ten milliseconds. Not all pulses associated with knock have this classic shape; however, a sufficiently large percentage of such pulses, particularly of the most severe knock, match this shape as to give the application of the technique some validity. In addition, the noise is not true white noise, so that the filter characteristic obtained might not actually be optimum, however, it may nevertheless prove to be a useful filter.

Figure 5A:
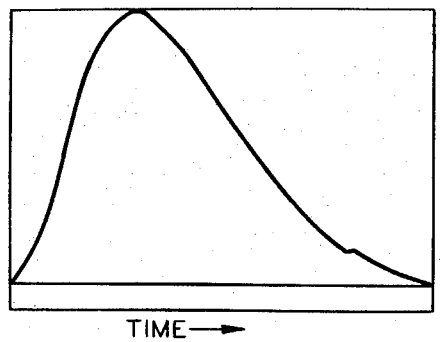
FIG. 5a shows a time plot of the envelope of a typical knock pulse.
Figure 5B:
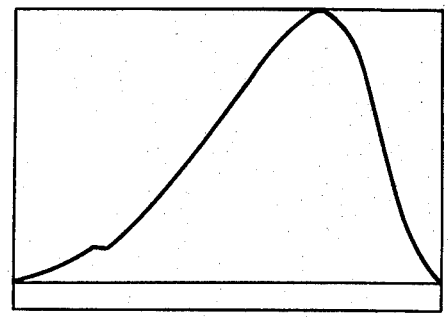

The application of matched filter theory to the pulse waveform shown in FIG. 5a yields a filter impulse response which is the time reversed image of the pulse, as shown in FIG. 5b. This characteristic can be designed in a tapped analog delay line; and such a filter has been used in place of the low pass filter shown in the embodiment herein with very good results. In fact, the matched filter was the first filter used in the development of this invention. However, the tapped analog delay line is a comparatively expensive device available only in comparatively small quantities in the commercial market.

Figure 6A:
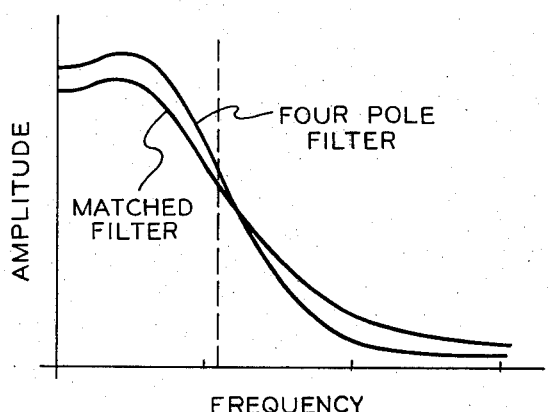
FIGS. 6a and 6b are plots of amplitude and phase, respectively, for a typical multipole low pass filter suitable for use in this invention and the matched filter having the impulse response shown in FIG. 5b.
Figure 6B:
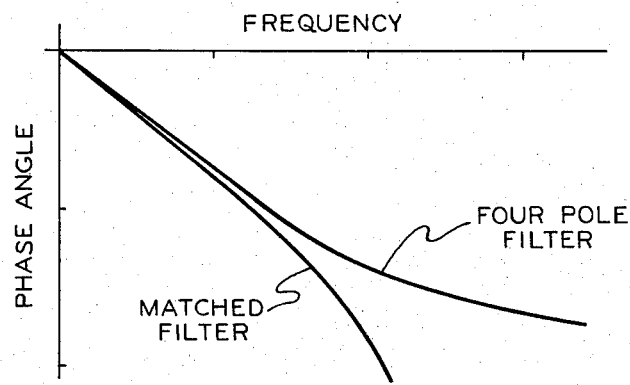

A four pole low pass filter with a half power frequency of 131 Hertz, however, shows great similarity to the matched filter described by FIG. 5b in a plot of amplitude versus frequency as shown in FIG. 6a. In addition, the filters match in a plot of phase shift versus frequency at least through the portion of the frequency spectrum where the amplitude output of the filters is substantial. The divergence of the filters in phase shift occurs only at frequencies higher than the half power frequency, so that it has little effect on the actual filter performance. It is interesting to note that the divergence in phase shift occurs at lower frequencies as the number of poles in the filter is reduced. This appears consistent with the finding of reduced performance as the number of poles is reduced.

The output signal of low pass filter 32 is shown in a sample waveform 32a in FIG. 4. Pulses 32b, 32c and 32d, which correspond to similarly numbered pulses in waveforms 30a and 31a, are each somewhat elongated in duration by low pass filter 32. However, pulse 32d, which corresponds with the actual knock pulse, is now significantly greater in amplitude than either of pulses 32b and 32c. This can be seen with reference to a constant amplitude line 32e.

The output signal from low pass filter 32 is supplied to a noise channel 33, which generates a unidirectional voltage noise reference signal that generally follows the average voltage of the output of low pass filter 32. The relative output levels of filter 32 and noise channel 33 are adjusted by suitable amplifier and voltage divider means so that the noise reference signal is maintained at a level below the peaks of the knock induced pulses in the output of low pass filter 32 but greater than most of the rest of said signal. The ideal output of noise channel 33 would be a signal such as that shown in line 32e of FIG. 4; although, as explained in the aforementioned West et al U.S. Pat. No. 4,111,035, that ideal can only be approximated. The outputs of low pass filter 32 and noise channel 33 are compared in a comparator 34, the output of which assumes one level whenever a pulse in the output signal of low pass filter 32 exceeds the noise reference voltage and assumes another level when it does not. The output of comparator 34 is shown as waveform 34a of FIG. 4, assuming that the noise channel output voltage is as shown in line 32e. Although there is no output pulse from comparator 34 corresponding to pulse 32b, there is a short pulse 34c corresponding to pulse 32c and a much longer pulse 34d corresponding to 32d.

The output of comparator 34 is fed back through an inhibit channel 35 to noise channel 33. Inhibit channel 35 is similar in purpose and operation to the low pass filter described in the aforementioned West et al U.S. Pat. No. 4,111,035. Its effect is to compensate for the high content of knock signal in the noise channel 33 and thus prevent the output of noise channel 33 from going too high in response to strong knock pulses with consequent reduction in knock control capability.

The output of comparator 34 is further provided to an ignore timer 36 which converts the leading edge of each output pulse from comparator 34 to a rising exponential voltage, as seen in waveform 36a of FIG. 4 with pulses 36c and 36d. This produces the result in the following circuitry to be described below, of suppressing all pulses from comparator 34 of less than two milliseconds duration, which pulses are mostly due to short duration noise vibrations as described earlier, and shortening each knock pulse by the same two milliseconds.

The output of ignore timer 36 is provided to an add timer 37 which completes the previously described suppression of pulses and delay of leading edges and delays the end of each pulse by a constant time duration such as three milliseconds. Add timer 37 thus provides a desired ratio between short and long pulses for best control of both light and heavy knock. In adding three milliseconds to each pulse, add timer does not merely make up for the shortening effect of ignore timer 36, but provides an overall adjustment for the relative control of light and heavy knock which is available to the circuit designer. Waveform 37a of FIG. 4 includes extended pulse 37d. The ignore and add timers may be provided with longer times, such as 7 and 8 milliseconds, respectively.

The output of add timer 37 is provided to an integrator 38, the output of which is seen in waveform 38a of FIG. 4. Integrator 38 includes a fast charge characteristic for a quick spark retard in response to knock but a slow discharge characteristic for a slow, controlled recovery from said retard in the absence of knock. In addition, the output of integrator 38 is limited by a maximum retard clamp 39. The output of integrator 38 is applied to spark retard circuit 22 to produce the desired spark retard.

Figure 3:
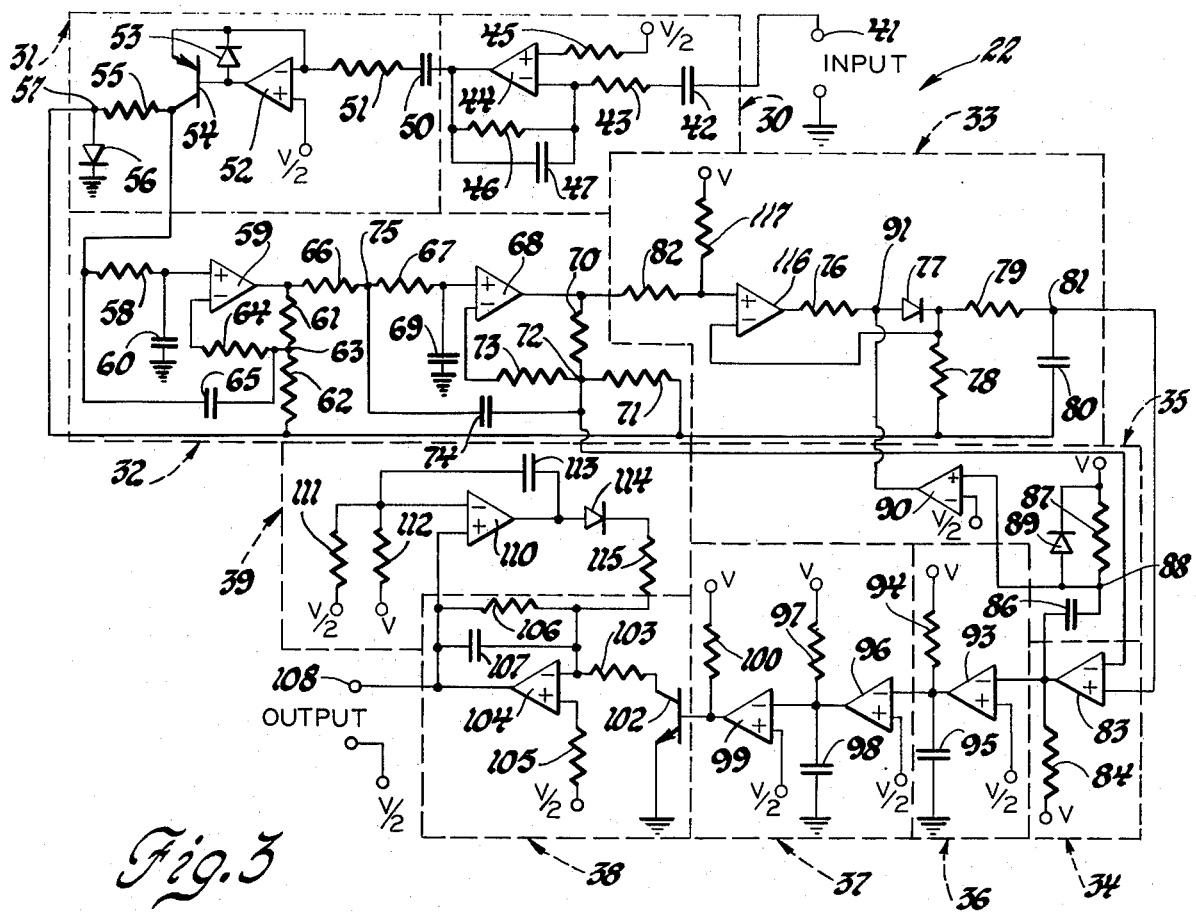
FIG. 3 is a circuit diagram of a preferred embodiment of the apparatus shown in block diagram form in FIG. 2.

FIG. 3 shows a circuit diagram of a preferred embodiment of the system shown in block form in FIG. 2. Input terminal 41 is connected through a capacitor 42 and resistor 43 to the inverting input of an operational amplifier or op amp 44, the noninverting input of which is connected through a resistor 45 to an electric power source at voltage V/2. The output of op amp 44 is connected in feedback through a parallel resistor 46 and capacitor 47 to the inverting input. These elements comprise bandpass amplifier 30.

The output of op amp 44 is connected through a series capacitor 50 and resistor 51 to the inverting input of an op amp 52, the noninverting input of which is connected to the electrical power supply at voltage V/2. The output of op amp 52 is connected in feedback to the inverting input through a diode 53 and is further connected to the base of a PNP bipolar transistor 54 having its emitter connected to the inverting input of op amp 52. Diode 53 is oriented with its anode connected to the output of op amp 52. The collector of transistor 54 is connected through a resistor 55 and a diode 56 to ground, the diode 56 being oriented with its cathode connected to ground. These elements comprise demodulator 31.

The collector of transistor 54 is further connected through a resistor 58 to the noninverting input of an op amp 59, which input is also connected to ground through a capacitor 60. The output of op amp 59 is connected through series resistors 61 and 62 to junction 57 between resistor 55 and diode 56. Junction 63 between resistors 61 and 62 is connected through a resistor 64 to the inverting input of op amp 59 and also through a capacitor 65 to the collector of transistor 54.

The output of op amp 59 is further connected through a series pair of resistors 66 and 67 to the noninverting input of an op amp 68, which input is further connected to ground through a capacitor 69. The output of op amp 68 is connected through a series pair of resistors 70 and 71 to junction 57; and the junction 72 between resistors 70 and 71 is connected through a resistor 73 to the inverting input of op amp 68 and through a capacitor 74 to the junction 117 of resistors 66 and 67. Elements 58–75 described above comprise the multipole low pass filter 32. The form of the filter in this embodiment is a pair of cascaded two pole Butterworth filters having identical poles. The outputs of each of the Butterworth filters, as well as that of demodulator 31 and noise channel 33 are referenced to junction 57 at one diode drop above ground so that op amps 59, 68 and 116 will produce a "zero" output for a "zero" input. The filter constructed around op amp 59 takes its feedback from junction 63 so that a voltage gain is provided through the series pair of resistors 61 and 62 to make up for attenuation losses in the filter. The filter constructed around op amp 68 provides a voltage gain similarly through series resistors 70 and 71.

The output of op amp 68 is provided through a resistor 82 to the noninverting input of an op amp 116, which input is further connected through a resistor 117 to a voltage source at voltage V. The output of op amp 116 is connected through a resistor 76 and diode 77 to the inverting input. The inverting input of op amp 116 is connected to the cathode of diode 77 and further through a resistor 78 to junction 57. The inverting input of op amp 116 is further connected through a series resistor 79 and capacitor 80 to junction 57. These elements comprise the noise channel 33, with op amp 116 and diode 77 providing a detecting function and resistor 79 and capacitor 80 comprising a low pass filter with an output from their junction 81.

Junction 81 is connected to the noninverting input of a comparator 83, the output of which is tied through a resistor 84 to the electric power source at voltage V. The inverting input of comparator 83 is connected to junction 72, so that resistors 70 and 71 control the amplitude of the noise reference level, corresponding to line 32e in FIG. 4, relative to the amplitude of the knock pulses in the signal from filter 32. Comparator 83 and resistor 84 comprise the comparator 34.

The output of comparator 83 is connected through a capacitor 86 and resistor 87 in series to the electrical power source at voltage V, with junction 88 between capacitor 86 and resistor 87 being connected to the anode of a diode 89 having its cathode connected to the power source at voltage V. Junction 88 is further connected to the noninverting input of a comparator 90 having an inverting input connected to the electrical power source at voltage V/2 and an output connected to a junction 91 between resistor 76 and diode 77. Elements 86 through 90 comprise the inhibit channel.

In operation, an input knock signal applied to terminal 41 is amplified and filtered with a broad bandpass characteristic in bandpass amplifier 30, detected in detector 31 and filtered in filter 32. The time average of the output of filter 32 is obtained in noise channel 33 and applied to the noninverting input of comparator 83. The output of filter 32 obtained from junction 72, reduced in amplitude from that obtained at the output of op amp 68 by the voltage divider resistors 70 and 71, is provided to the inverting input of comparator 83. Thus, in the absence of a large pulse such as 32c or 32d in FIG. 4, the output of comparator 83 is high and the output of comparator 90 does not affect junction 91 of noise channel 33. When a pulse in the signal from junction 72 exceeds the noise reference output of channel 33, however, the output of comparator 83 falls to a low level. Capacitor 86 causes the noninverting input and output of comparator 90 to fall with the output of comparator 83, which reverse biases diode 77 to prevent the noise channel voltage from being greatly increased by the same pulse coming through the knock channel 33. Capacitor 86 begins to charge immediately, however, so that the output of comparator 90 rises to once again forward bias diode 77. Diode 89 provides a quick discharge path for capacitor 86 when the output of op amp 83 switches high again.

The output of comparator 83 is connected to the inverting input of a comparator 93, the noninverting input of which is connected to the electric power source at voltage V/2. The output of comparator 93 is connected through a resistor 94 to the power source at voltage V, through a capacitor 95 to ground and directly to the inverting input of a comparator 96, the noninverting input of which is connected to the power source at voltage V/2. Elements 93–95 comprise ignore timer 36.

The output of comparator 96 is connected through a resistor 97 to the power source at voltage V, through a capacitor 98 to ground and directly to the inverting input of a comparator 99. Comparator 99 has a noninverting input connected to the power source at voltage V/2 and an output connected through a resistor 100 to the power source at voltage V. Elements 96–100 comprise the add timer 37.

In operation, a downward swing of the voltage output of comparator 83, which indicates the beginning of a knock pulse, causes the output of comparator 93 to attempt to swing high. However, there is a time delay caused by the charging of capacitor 95 before this voltage, which is applied to the inverting input of comparator 96, can swing up above voltage V/2. When it does, the output of comparator 96 swings low immediately and causes the output of comparator 99 to swing high. Thus, a delay is introduced by ignore timer 36 to the leading edge of a knock pulse.

When the output of comparator 83 swings high again, the output of comparator 93 immediately swings low and the output of comparator 96 attempts to swing high. In this case, however, a time delay is introduced by the necessity of capacitor 98 to charge; and this delays the following swing of the output of comparator 99 low. Thus, a time delay is introduced by add timer 37 at the end of a knock pulse.

The output of comparator 99 is connected to the base of a bipolar NPN transistor 102 having a grounded emitter and a collector connected through a resistor 103 to the inverting input of an op amp 104. Op amp 104 has a noninverting input connected through a resistor 105 to the electric power source at voltage V/2 and an output connected through a parallel resistor 106 and capacitor 107 back to the inverting input. These elements comprise the integrator 38, with a fast charging path for capacitor 107 during a knock pulse through transistor 102 and resistor 103 and a slower discharge path for capacitor 107 during the absence of a knock pulse through resistor 106. The output of op amp 104 comprises an output terminal 108 for knock measuring circuit 28 with the knock voltage measured in the positive direction relative to V/2.

The output of op amp 104 is further connected to the noninverting input of an op amp 110, which has an inverting input connected through a resistor 111 to electric power source at voltage V/2 and through a resistor 112 to the electric power source at voltage V. The output of op amp 110 is connected back to the inverting input through a capacitor 113 and through a series diode 114 and resistor 115 to the inverting input of op amp 104, the diode oriented with its anode connected to the output of op amp 110. These items comprise the maximum retard clamp 39. In operation, when the output voltage of op amp 104, which is also the knock retard voltage, reaches the reference voltage on the inverting input of op amp 110, op amp 110 turns on and supplies current to the inverting input of op amp 104 through diode 114 and resistor 115. This current passes through transistor 102 and decreases the current drawn from capacitor 107 so that the output of op amp 104 does not increase further. With this method of clamping there is no overcharging of capacitor 107; and the output of op amp 104 is able to begin falling immediately at the end of a knock pulse. A list of parts and component values for use in the embodiment described above follows:

| Capacitors | Transistors |
|---|---|
| 42 - 390 μμF | 54 - 2N3906 |
| 47 - 33 μμF | 102 - 2N4401 |
| 50 - 0.1 μF | |
| 60,65,69,74 - 0.068 μF | |
| 80 - 2.7 μF | |
| 86,98 - 0.022 μF | |
| 95 - 0.01 μF | |
| 107 - 4.7 μF | |
| 113 - 22 μμF | |
| Resistors | Op Amps |
| 43 - 75K | 44,52 - LM1458 |
| 45,46 - 680K | 59,68,116 - LM2904 |
| 51 - 3.65K, 1% | 104,110 - LM2902 |
| 55,58,66,67 - 14.7K, 1% | |
| 61 - 750 | |
| 62 - 1.24K, 1% | Comparators |
| 64,73 - 30K | 83,90,93,96 - LM2901 |
| 76,84,100 - 10K | |
| 78 - 68K | |
| 79 - 51K | |
| 87 - 750K | Diodes |
| 111 - 20K, 1% | all 1N485B |
| 112 - 29.4K | |
| 115 - 470 | |
| 117 - 475K, 1% | |

In addition, certain resistors may vary in value as the circuit is calibrated for a particular engine. Resistors 70, 71 and 82 determine the noise channel gain relative to the signal strength for application to the inputs of the comparator 34; resistor 94 determines the time delay of the ignore timer; and resistor 97 determines the time delay of the add timer. Finally, resistors 103 and 106 determine the relative charge and discharge rates of the integrator 38, while resistor 105 should be the same as resistor 106. Sample values for a Buick turbocharged V-6 3.8 L engine are: resistor 70—787, 1%; resistor 71—1.21K, 1%; resistor 82—4.53K, 1%; resistor 94—432K, 1%; resistor 97—232K, 1%; resistor 103—17K, 5%; resistors 105, 106—750K, 5%.

A mathematical analysis of the degradation in signal to noise ratio has been performed for a number of low pass filters having two, three and four poles in relation to the matched filter discussed at an earlier point in this application. The percent degradation was defined as 100 (1-SNR/SNRM), where SNR was the signal to noise ratio of the low pass filter, SNRM was the signal to noise ratio of the matched filter and noise was assumed to be white noise. This mathematical analysis yielded a figure of 5.7% degradation for a filter having four equal poles with a half power frequency of about 130 Hertz. The corresponding percent degradations for half power frequencies of 100 to 200 Hertz rose to approximately 8% and 14%, respectively. Of additional interest, however, is that a low pass filter of two identical poles achieved (mathematically) an optimum performance of 10.4% degradation at 90 Hertz and was degraded by 14% at about 60 Hertz. The entire curve of percent degradation for the two pole filter similar in shape to that of the four pole but was shifted slightly higher in percent degradation and slightly lower in frequency. It is indicated, therefore, that a two pole low pass filter with a half power frequency in the range 60 to 130 Hertz may give performance almost equal to at least some four pole filters having a half power frequency in the range 100 to 200 Hertz and the entire allowable range of half power frequency is extended to 60 to 200 Hertz. The results did not indicate performance for the two pole filter at any frequency equal to that of the performance of the four pole filter at 130–160 Hertz. However, the performance in an actual engine, as a practical matter, may be adequate.

The embodiments of the invention in which an exclusive property or privilege is claimed are defined as follows:

1. In combination:
a spark ignited internal combustion engine of the type in which knock-induced and other engine vibrations occur in bursts of at least one characteristic audio frequency;
means effective to sense said knock-induced and other vibration bursts and generate an electrical signal therefrom, said means having a wide passband around the characteristic frequency;
means effective to demodulate said electrical signal and thereby obtain the envelopes of said knock-induced and other engine vibration bursts; and
a low pass filter having a half power frequency within the range 60 to 200 Hertz and being effective to filter said envelopes of said knock-induced and other vibration bursts, whereby the filter reduces the amplitude of the envelopes of said other bursts in comparison with those of the knock-induced bursts for an improved signal to noise ratio in knock detection; and
means effective to generate a knock control signal from the output of said low pass filter and control an engine variable in response thereto to prevent undesirable levels of engine knock.

2. In combination:
a spark ignited internal combustion engine of the type in which knock-induced and other engine vibrations occur in bursts of at least one characteristic audio frequency;
means effective to sense said knock-induced and other vibration bursts and generate an electrical signal therefrom, said means having a wide passband around the characteristic frequency; means effective to demodulate said electrical signal and thereby obtain the envelopes of said knock-induced and other engine vibration bursts; and
a multipole low pass filter having a half power frequency within the range 60 to 200 Hertz and being effective to filter said envelopes of said knock-induced and other vibration bursts, whereby the filter reduces the amplitude of the envelopes of said other bursts in comparison with those of the knock-induced bursts for an improved signal to noise ratio in knock detection; and
means effective to generate a knock control signal from the output of said low pass filter and control an engine variable in response thereto to prevent undesirable levels of engine knock.

3. In combination:
a spark ignited internal combustion engine of the type in which knock-induced and other engine vibrations occur in bursts of at least one characteristic audio frequency;
means effective to sense said knock-induced and other vibration bursts and generate an electrical signal therefrom, said means having a wide passband around the characteristic frequency;
means effective to demodulate said electrical signal and thereby obtain the envelopes of said knock-induced and other engine vibration bursts; and
a low pass filter having a half power frequency within the range 100 to 200 Hertz and being effective to filter said envelopes of said knock-induced and other vibration bursts, whereby the filter reduces the amplitude of the envelopes of said other bursts in comparison with those of the knock-induced bursts for an improved signal to noise ratio in knock detection; and
means effective to generate a knock control signal from the output of said low pass filter and control an engine variable in response thereto to prevent undesirable levels of engine knock.

4. In combination:
a spark ignited internal combustion engine of the type in which knock-induced and other engine vibrations occur in bursts of at least one characteristic audio frequency;
means effective to sense said knock-induced and other vibration bursts and generate an electrical signal therefrom, said means having a wide passband around the characteristic frequency;
means effective to demodulate said electrical signal and thereby obtain the envelopes of said vibration bursts;
a low pass filter having a half power frequency substantially within the range 131 to 160 Hertz and being effective to filter the envelopes of said knock-induced and other vibration bursts, whereby the envelopes of said other bursts are reduced in amplitude compared with those of the knock-induced bursts for an improved signal to noise ratio in detection of engine knock; and
means effective to generate from the output of said low pass filter a knock control signal and control an engine variable thereby to prevent knock from exceeding predetermined desired levels.

5. In combination:
a spark ignited internal combustion engine of the type in which knock-induced and other engine vibrations occur in bursts of at least one characteristic audio frequency;
means effective to sense said knock-induced and other vibration bursts and generate an electrical signal therefrom, said means having a wide passband around the characteristic frequency;
means effective to demodulate said electrical signal and thereby obtain the envelopes of said knock-induced and other engine vibration bursts;
a multipole low pass filter having a half power frequency within the range 100 to 200 Hertz and being effective to filter said envelopes of said knock-induced and other vibration bursts, whereby the filter reduces the amplitude of the envelopes of said other bursts in comparison with those of the knock-induced bursts for an improved signal to noise ratio in knock detection; and means effective to generate a knock control signal from the output of said low pass filter and control an engine variable in response thereto to prevent undesirable levels of engine knock.

6. In combination:

a spark ignited internal combustion engine of the type in which knock-induced and other engine vibrations occur in bursts of at least one characteristic audio frequency;

means effective to sense said knock-induced and other vibration bursts and generate an electrical signal therefrom, said means having a wide passband around the characteristic frequency;

means effective to demodulate said electrical signal and thereby obtain the envelopes of said vibration bursts;

a multipole low pass filter having a half power frequency substantially within the range 131 to 160 Hertz and being effective to filter the envelopes of said knock-induced and other vibration bursts, whereby the envelopes of said other bursts are reduced in amplitude compared with those of the knock-induced bursts for an improved signal to noise ratio in detection of engine knock; and means effective to generate from the output of said low pass filter a knock control signal and control an engine variable thereby to prevent knock from exceeding predetermined desired levels.

7. In combination:

a spark ignited internal combustion engine of the type in which knock-induced and other engine vibrations occur in bursts of at least one characteristic audio frequency;

means effective to sense said knock-induced and other vibrations bursts and generate an electrical signal therefrom, said means having a wide passband around the characteristic frequency;

means effective to demodulate said electrical signal and thereby obtain the envelopes of said vibration bursts;

a four pole low pass filter having a half power frequency within the range of 100 to 200 Hertz and being effective to filter the envelopes of said knock-induced and other vibration bursts, whereby the amplitude of the envelopes due to the other vibration bursts is reduced in comparison with the amplitude of the envelopes due to the knock-induced bursts for an improved signal to noise ratio in engine knock detection; and means effective to generate from the output the four pole low pass filter a knock control signal and apply said knock control signal to an engine variable to prevent engine knock from exceeding a predetermined knock limit.

8. In combination:

a spark ignited internal combustion engine of the type in which knock-induced and other engine vibrations occur in bursts of at least one characteristic audio frequency;

means effective to sense said knock-induced and other vibration bursts and generate an electrical signal therefrom, said means having a wide passband around the characteristic frequency;

means effective to demodulate said electrical signal and thereby obtain envelopes of said vibration bursts;

a four pole low pass filter having a half power frequency substantially within the range 131 to 160 Hertz and being effective to filter said envelopes of said vibration bursts, whereby the envelopes due to said other vibration bursts are reduced in amplitude compared with the envelopes of said knock-induced bursts for an improved signal to noise ratio in detection of engine knock;

means effective to compare the envelopes in the output of said four pole low pass filter with a noise reference and generate output knock pulses while the former exceeds the latter;

means to generate a knock control signal from said output knock pulses and vary the spark timing of said engine in response to said knock control signal to prevent knock intensity from exceeding a predetermined desired level during engine operation.

9. In combination:

a spark ignited internal combustion engine of the type in which engine knock and other noise producing events generate ringing engine vibrations, the vibrations taking the form of modulated bursts of a characteristic carrier frequency in the audio range;

means effective to sense said vibrations at the carrier frequency and generate an electrical signal therefrom, said means including amplification means having a passband characteristic effective to suppress low frequency ignition induced noise and radio frequency signals but having a passband sufficiently wide to allow for normal variations in the characteristic carrier frequency;

means effective to demodulate said electrical signal and thereby obtain the envelope pulses of said bursts of knock-induced and other ringing vibrations;

a four pole low pass filter having a half power frequency substantially within the range of 131 to 160 Hertz, said filter being effective to filter said demodulated electrical signal, whereby the amplitude of the envelope pulses due to events other than knock are reduced in comparison with the amplitude of the envelope pulses due to knock for an improved signal to noise ratio in engine knock detection; and means effective to generate a knock control signal from said filtered demodulated electrical signal and control an engine variable in response to said knock control signal to prevent engine knock intensity from exceeding a predetermined limit.

10. An engine knock control for an internal combustion engine subject to knock-induced and other bursts of engine vibrations, the knock-induced bursts being generally characterized by a characteristic envelope shape and duration, the engine including means effective to generate an electrical signal representing said engine vibrations, the engine knock control comprising, in combination:

detector means effective to extract the envelopes of said vibration bursts;

a filter effective to receive said envelopes, the filter having a low pass amplitude versus frequency response substantially similar, at least in half power frequency, to that of the matched filter for the time reversed characteristic envelope shape and further having a phase versus frequency response similar to that of said matched filter within the low frequency passband, whereby envelopes of knock-induced vibrations are increased in amplitude relative to those of other vibrations; and means effective to generate a knock control signal from said filtered envelopes of knock-induced vibrations and control an engine parameter therewith to prevent undesirable levels of engine knock.

* * * * *